April 24, 1956 H. L. DANIELS ET AL 2,743,320

VARIABLE AREA MAGNETIC RECORDING SYSTEM

Filed Dec. 13, 1949 3 Sheets-Sheet 1

INVENTORS
HOWARD L. DANIELS
& SIDNEY M. RUBENS
BY
Cushman, Darby & Cushman

INVENTORS
HOWARD L. DANIELS
& SIDNEY M. RUBENS
By
Cushman, Darby & Cushman

VARIABLE AREA MAGNETIC RECORDING SYSTEM

Filed Dec. 13, 1949 3 Sheets-Sheet 3

INVENTORS
HOWARD L. DANIELS
& SIDNEY M. RUBENS
By
Cushman, Darby & Cushman

United States Patent Office 2,743,320

Patented Apr. 24, 1956

2,743,320

VARIABLE AREA MAGNETIC RECORDING SYSTEM

Howard L. Daniels and Sidney M. Rubens, St. Paul, Minn., assignors, by mesne assignments, to Sperry Rand Corporation, New York, N. Y., a corporation of Delaware Application December 13, 1949, Serial No. 132,732

20 Claims. (Cl. 179—100.2)

This invention relates to a new and improved system for making and using magnetic recordings, such as telegraphone recordings. There is provided a system of recording which is an improvement to the present practice of the art in that records of improved quality will be afforded, both as to linearity and fidelity of the recording and subsequent playback. The frequency range which can be accommodated is also greatly enlarged, and means are provided for making the record visible.

Briefly, the invention involves applying a different state of magnetization to adjacent areas of a member such as a tape, sheet or analogous surface of magnetizable material. A boundary is thus formed between these areas of differing magnetization, and this boundary is caused to be shifted along the record area in response to the intelligence to be recorded. Playback is then effected by tracing the boundary with a suitable pickup device. The boundary is caused to shift either by physical movement of the magnetizing device, or there may be employed a stationary device in which the magnetic flux is shifted electrically, without requirement for physical shifting. Means are also disclosed for making such records visible by applying finely divided magnetic material to the record, whereby the boundary is outlined by the thereto attracted magnetic material.

Therefore, it is an object of this invention to provide a system of recording which will be superior to the present art in that improved quality will be provided as to linearity, fidelity and the frequency range to be accommodated.

A further object is to provide a system of magnetic recording in which no physical movement of the recording device in response to the signal is required.

A still further object is to provide a recording head which may equally well be moved in translation relative to a stationary record, or the record may move in translation relative to a stationary head.

A still further object is to provide means for making a visible magnetic record.

Still further objects and the entire scope of applicability of the present invention will become apparent from the detailed description given hereinafter; it should be understood, however, that the detailed description, while indicating a preferred embodiment of the invention, is given by way of illustration only, since various changes and modifications within the spirit and scope of the invention will become apparent to those skilled in the art from this detailed description.

A more complete understanding of the invention may be had by reference to the accompanying drawings in which:

Figures 1*a*–1*d* illustrate the underlying principle of this invention and show the manner in which it is applied in a typical case;

Figures 4, 4A, 5, 5A, 6, 6A:
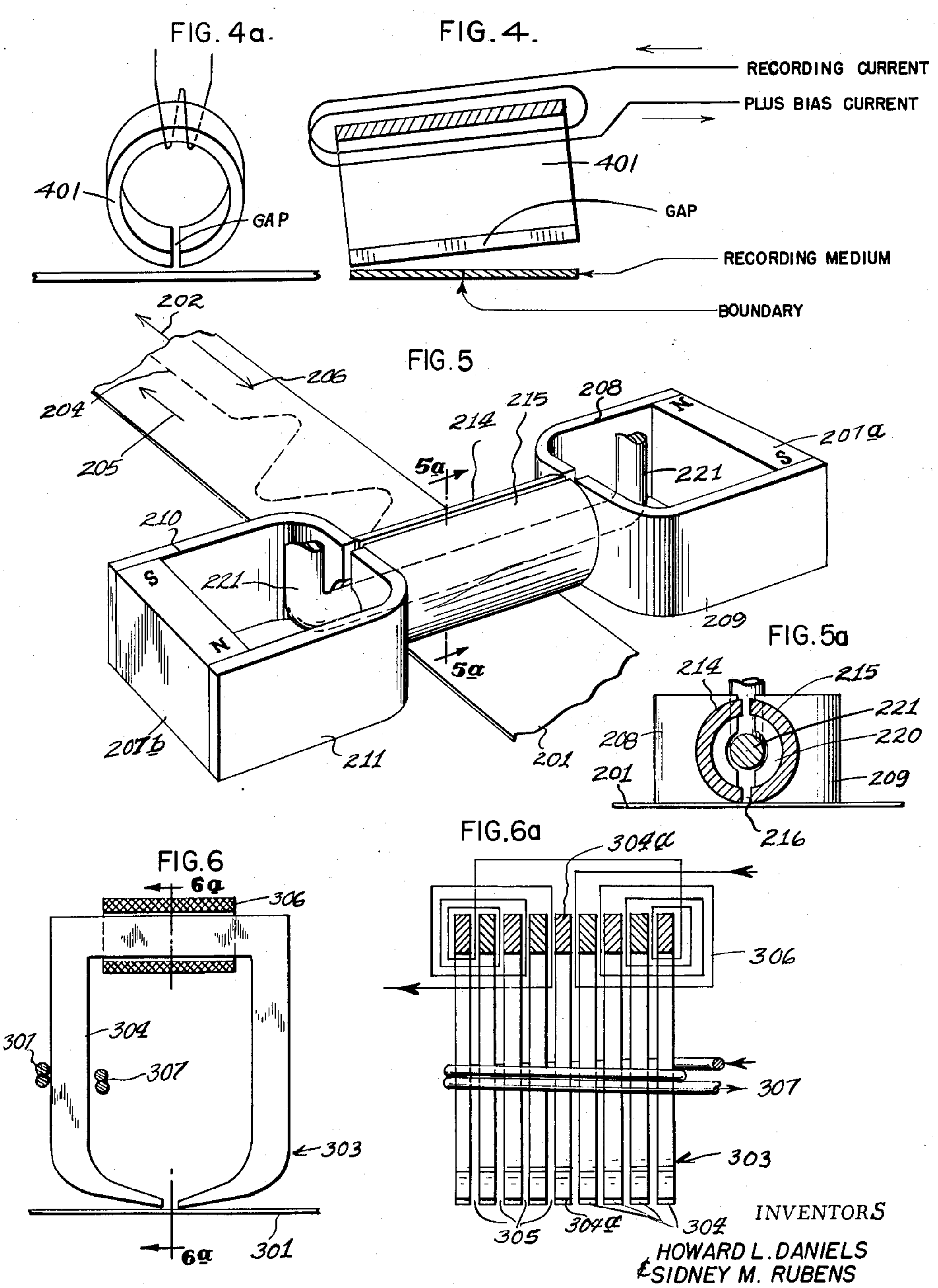
Figure 4 shows a simplified recording head for use in the invention.

Figure 4*a* is a cross section view of the head of Figure 4;

Figure 5 shows a recording head of another form, using permanent magnets as a source of bias;

Figure 5*a* is a cross section view of the head of Figure 5;

Figure 6 shows a logarithmic recording head;

Figure 6*a* is a cross section view of the head of Figure 6; and

Figure 7:
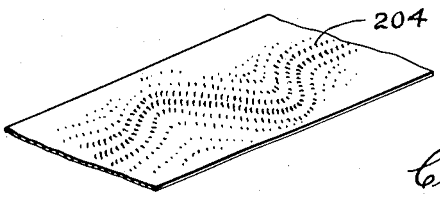

Figure 7 illustrates the appearance of the visible recording.

Figure 1A:
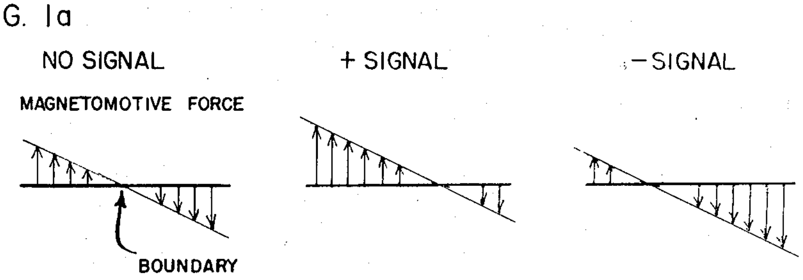

Referring first to Figure 1*a*, there is shown a particular configuration of magnetomotive force (hereinafter, M. M. F.) which, in one form or another, is typical of the distribution of this force as applied to each succeeding element of the magnetic tape. For the purpose of this specification, an "element" is defined as a line running across the width of the tape. This is the same thing as the successive portions which the gap in a conventional recording head occupies on the tape as the latter is drawn past the gap. More precisely, an element may be defined as the generatrix of the tape. Also, for the purpose of this specification, the word "tape" is to be construed liberally to include its geometrical equivalents, such as an extensive surface of magnetic material, a band on the circumference of a drum or an annular ring or a spiral on the face of a disc. In the case of the "no signal" condition, such as might be encountered during a silent period of a conversation, it will be seen that the M. M. F. is a maximum in one direction at one edge of the field and at a similar maximum but in the opposite direction at the opposite edge of the field, there being an approximately continuous gradation of the M. M. F. between two conditions as shown by the relative lengths of the arrows or vectors of the figure. As a result of this gradation, there exists at approximately the center of the field a point to which no M. M. F. is applied; this point may be termed the "boundary" since it separates the two areas in which the M. M. F. has an opposite sense or direction. While the magnetic forces are here shown as directly opposite, it is obvious they can be effective as long as they are only substantially different in direction.

When signals are impressed upon the recording head, the immediate effect is to cause the above described boundary to shift sideways, as will be more fully described below. Figure 1*a* illustrates such a shift in the + direction and then in the − direction. It is clear from this drawing that the shift in the boundary has the net effect of altering the relative amounts of the two opposite states of magnetization. In the "no signal" case, these two amounts are equal and, since they are of opposite sense, there is no net remainder of one or the other; however, in the case of the + or − signal, the shift in the boundary has the direct result of altering this net balance so that there is an excess of one or the other of the two states of magnetization. This excess of one state or the other is to be recorded as explained below in connection with Figures 1*b* and 1*c* and subsequently used to actuate a reading or playback head. Thus, this shifting boundary is the direct expression of the intelligence being recorded, and subsequently this becomes the direct means for playback of the originally recorded intelligence.

Figure 1B:
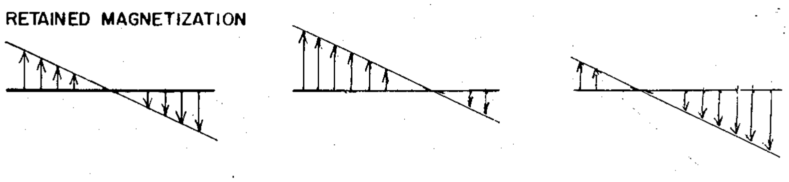

Figure 1*b* shows the result of applying the M. M. F. distribution of Figure 1*a* to a magnetic recording tape which, it is assumed, is capable of resisting saturation even when subjected to the highest M. M. F. involved.

It will be seen that Figure 1*b* is identical with Figure 1*a* except for terminology. This is the expected result of a system which does not saturate and which is therefore "linear" in the usual engineering sense.

Figure 1C:
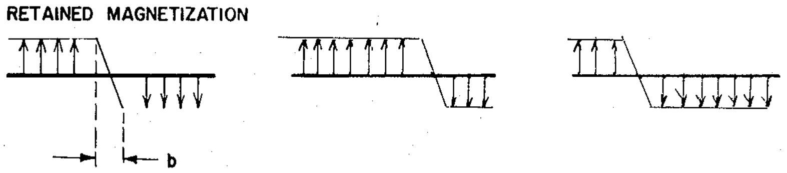

Figure 1*c* shows the result of applying the M. M. F. distribution of Figure 1*a* to a tape which saturates readily, and at relatively low values of M. M. F. In this case the two opposite states of magnetization are equal in magnitude, there being a boundary between them which is somewhat different from the boundary of Figure 1*c* in that it represents a substantially abrupt change between the two opposite states of magnetization. It is desirable that this boundary be made as abrupt as possible, and to this end, a magnetic tape which saturates quite readily is selected. However, this boundary cannot be made infinitesimally small and, in practice, there will be a "boundary region" (*b*) across which the recorded flux is tapering from the saturation maximum in the other direction. As long as all points within the region (*b*) remain within the width of the record, it is clear that this system will record in a truly linear manner. Figure 1*c* illustrates the preferred embodiment of this invention. Stated otherwise, we prefer to use a magnetic tape which saturates readily.

In a more general case, it may be desirable to permit this boundary to move beyond the physical limits of the tape as illustrated in Figure 1*b*. This figure illustrates the results of applying this technique to a medium which is essentially linear, with the boundary placed within the confines of the tape. Provided that the medium is essentially linear, there is no reason why the boundary must remain within the confines of the tape and, in fact, certain advantages result from permitting the boundary to move beyond the edge of the tape. Persons skilled in the art will recognize that the advantages of such a projected boundary recording over ordinary non-saturated (D. C. erase and bias) intensity recording are: (1) larger undistorted peak signal (2) lower tape noise for no signal, or, in short, a greater dynamic range. The projected boundary system compares favorably with the best supersonic-bias recording, while avoiding the difficulties which attend the introduction of the necessarily critically controlled supersonic signal.

It will be apparent from the foregoing that, in the most general sense, this invention relates to a system of magnetic recording in which the intensity of magnetization of the points along each element of the tape is a function not only of the signal intensity, but of position of the points along that element.

Figure 1D:
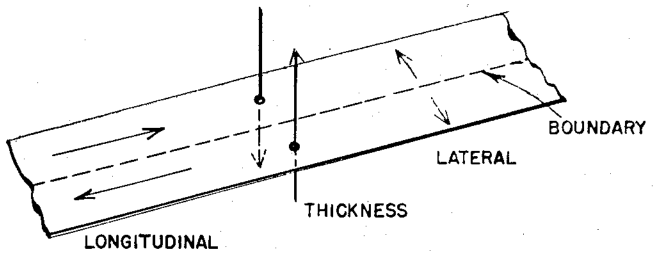

Figures 1*a*, 1*b*, and 1*c* are schematic insofar as they do not specify the direction of the magnetic flux with respect to the magnetic record, but merely show that the parts of the tape on opposite sides of the boundary are characterized by different states of magnetization. It is apparent, however, that this configuration may be applied to the record in any of the three orthogonal directions. Thus, we might have a boundary system of magnetic recording operating in the longitudinal direction: That is, the two differing states might be magnetized in the direction of the motion of the tape and in the direction opposite to this motion. Likewise, a boundary system of magnetic recording which operates in the thickness direction: That is, magnetization down through a tape for one state and up through the tape for the opposite state is quite practical. Similarly, it would be possible to provide a boundary system of magnetic recording which operates in the lateral direction or across the record. All three of these are illustrated in Figure 1*d*. All three of these systems are feasible but the first two represent preferred embodiments of this invention, and they are the only ones which will be further illustrated in this description.

Figure 2:
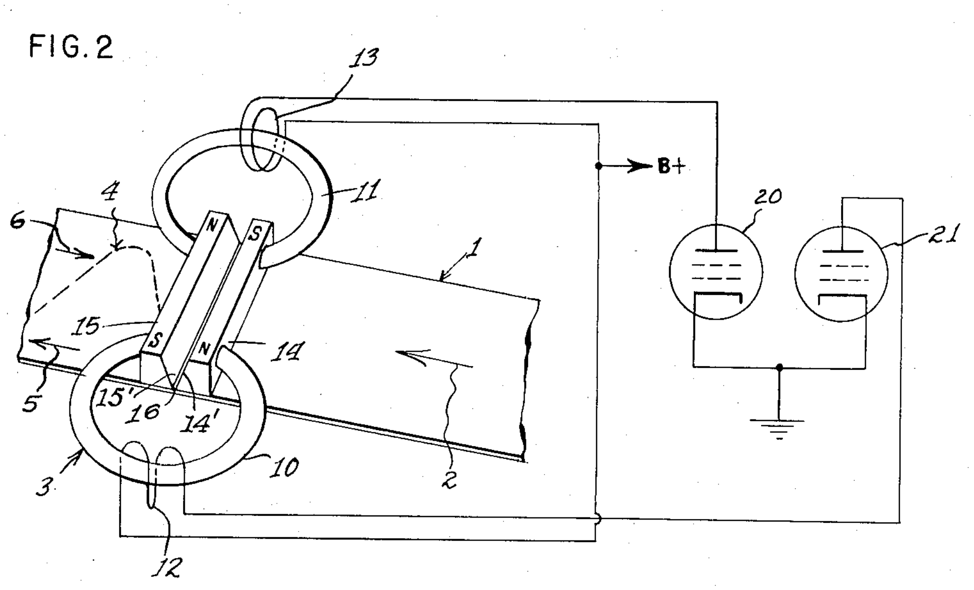
Figure 2 shows a preferred form of magnetic recording head for use in connection with this invention and part of a preferred form of associated circuits.

Figure 2 shows a preferred form of magnetic transducer, or "head," which may be used to carry out the methods and objectives of this invention. This particular figure shows a head suitable for making recordings in which the differentiation between the two states of magnetization on the opposite sides of the boundary is in the form of the difference of sense in the longitudinal direction. As is arbitrarily illustrated in Figure 2, that portion lying to the left of the boundary is magnetized in the same direction as the direction of motion of the tape, while the area on the right of the boundary is magnetized in a direction opposite to the direction of motion of the tape. There may be other incidental components of magnetization in other directions, but these will usually be negligibly small compared to the magnitudes involved in the record. Of course, it is equally feasible to arrange the flux in a different manner, and the foregoing is presented only for the sake of clarity in presentation and is not to be construed as an absolute requirement of a workable system. This figure also illustrates the head as it might be incorporated in a conventional push-pull circuit of the type which is well-known to those skilled in the art. In more detail, the magnetic tape 1 is moving in the direction of the arrow 2 underneath the magnetic head 3 so as to subject it to an M. M. F. which will create thereby a recording on tape 1 characterized by a boundary 4 between two opposite states of magnetization schematically illustrated by the vectors 5 and 6. The head 3 consists of the two magnetic yokes 10 and 11 having wound thereon coils 12 and 13. The tips of these two yokes are joined by a magnetically permeable pair of bars 14 and 15 which reach across the full width of the tape so as to form a completely closed magnetic circuit from yoke 10 to bar 14 to yoke 11 to bar 15 and back to yoke 10. Sufficient magnetic reluctance is provided by bars 14 or 15 or both to absorb a large part of the applied M. M. F. Bars 14 and 15 are in close proximity to each other but do not actually touch, instead they are seperated by a few thousandths of an inch so as to form pole surfaces 14' and 15' with a small gap 16 therebetween. It is arranged that the magnetic tape 1 will pass over the head either in contact with or very nearly in contact with the pole pieces 14' and 15' and thereby bridge the gap 16 between them. If the coils 12 and 13 are now connected in a push-pull circuit consisting of the tubes 20 and 21, and if the bias on these tubes is appropriately adjusted in a manner well-known to those skilled in the art, then the pole pieces will become magnetized in a manner which may be illustrated by the north (N) and south (S) markings shown in Figure 2. Since the windings 12 and 13 are identical and have equal currents therethrough, it is clear that the magnetization strength at the opposite ends of the pole pieces 14 and 15 will be equal, but they will be of opposite sense. The effect of the pole pieces is to provide a gradual gradation between the extreme conditions previously described which exist at the two ends of these pole pieces. Thus it will be seen that the head illustrated in Figure 2 will produce an M. M. F. distribution across the gap 16 which is identical with that in Figure 1*a*. Following the line of reasoning previously described, it is clear that this arrangement will produce a boundary 4 between oppositely magnetized states as illustrated by the vectors 5 and 6. It is also clear that, by impressing a signal upon the control grids of the push-pull 20 and 21 in the conventional manner that the currents from coils 12 and 13 will be made unequal and this in turn will cause the boundary 4 to shift back and forth as the tape is moved, due to stronger magnetization in one sense than in the other.

Figure 3:
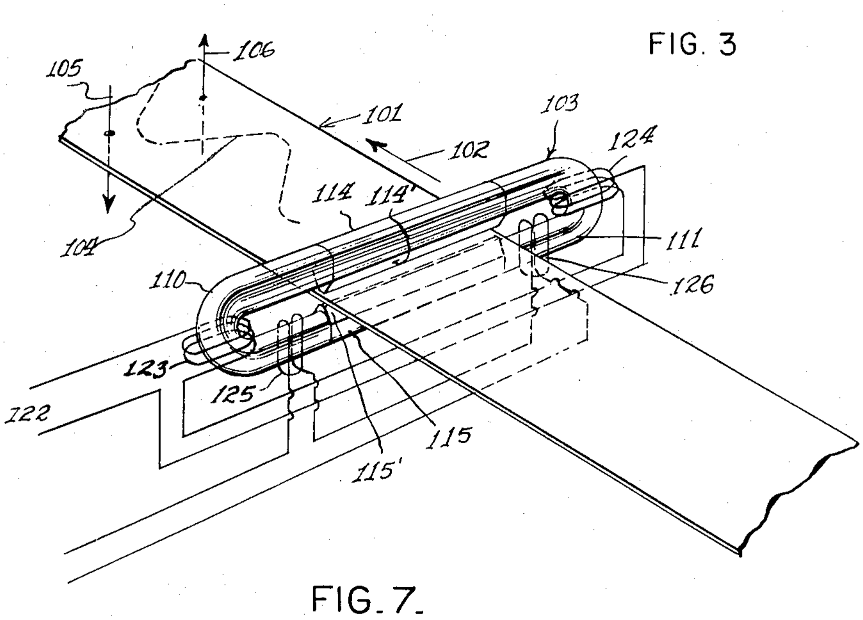
Figure 3 illustrates an alternative of this embodiment invention, together with an alternative form of associated circuits.

Figure 3 illustrates an alternative construction for a head and an alternative means for operating it. This figure furthermore illustrates thickness recording in the boundary system and also the use of a separate source of bias current. In this case 101 illustrates a tape which is being moved past the recording head 103 in the direction of arrow 102 so as to produce a recording characterized by a boundary 104 between two opposite states of magnetization 105 and 106. In this figure is illustrated the case in which arrow 105 is directed down through the tape whereas 106 runs up through the tape, although, of course, the opposite represents an equally workable system. Two yokes 110 and 111 are employed in connection with two bars of magnetic permeable material 114 and 115 to form a closed magnetic circuit substantially described previously. In this case, however, the tape 101 passes between the bars 114 and 115 and hence the pole pieces 114' and 115' are necessarily upon opposite sides of the tape and necessarily somewhat different in shape as will be appreciated by those skilled in the art. A source of bias current 122 is shown as flowing through the two oppositely wound bias coils 123 and 124 connected in series. These coils are equal in size and hence give rise to an M. M. F. distribution as illustrated in Figure 1*a* which is here oriented in the thickness direction of tape. The signal is introduced by utilizing the signal current coils 125 and 126 which are both wound in the same direction. The effect of a signal in this winding is obviously to cause the boundary to shift back and forth across the tape as illustrated in Figure 1*a*, this in turn results in a tape of record illustrated in Figure 1*b* for the unsaturated case and 1*c* for the saturated case.

In any case, the methods of playback and erasure for the boundary types of recording herein described are similar to those commonly employed in existing methods of magnetic recording. That is, for playback, a magnetic head comprising a single gap scanning the entire active width of the tape, with a suitable magnetic yoke and coil assembly to translate net changes in flux into voltage signals, may be used. Obviously, longitudinal type playback heads must be used in this connection with boundary records made from longitudinal type recording heads; similarly, thickness type playback heads must be used with thickness type boundary recordings. Erasure may be effected in any manner, such as D. C. erase or supersonic erase which brings all points of the tape to the same state of magnetization, which state could either be magnetically neutral or magnetically saturated in one direction or the other as long as is is consistent throughout the tape.

For certain applications, it may be desirable to provide a head which is more economical to construct and operate than those previously described, but which will nevertheless achieve some of the characteristics and retain some of the advantages of the herein described boundary system of magnetic recording. Such a device is illustrated in Figures 4 and 4*a* which show in cross section a single broad recording yoke 401 which has been tilted so that its gap meets the corresponding tape element at an angle. The gap and the tape element, however, lie in the same plane, and the effect of the tilt is merely to place one end of the gap closer to the tape than the other. With this type of recording head, it is necessary to use tape which has been previously prepared to a uniform magnetic condition, as by placing a bias magnetizing head ahead of the recording head. Current is introduced in the coil in a direction such as to tend to overcome the pre-recorded magnetization of the tape. Owing to the tilt of the head, it is clear that the portion of the element over which the original magnetization is reversed depends on the magnitude of the signal current, since the effectiveness of a given current at a point on the tape element drops off approximately linearly with distance from the element to the head. A recording can also obviously be produced by simply decreasing the flux across the record with a boundary not actually being produced as explained above in connection with the projected boundary system.

Another structure which achieves the aims and objectives of this invention is set forth in Figure 5, which illustrates also the use of permanent magnets for supplying the proper bias field, thereby eliminating the copper losses inherent in the use of a bias current as shown in Figures 2, 3, and 4. In this figure, magnetic tape 201 is moved past the recording head in the direction of arrow 202 so as to produce a recording characterized by a boundary 204 between two opposite states of magnetization 205 and 206. In this figure is illustrated the case in which arrow 205 is pointed in the same direction as tape motion 202, whereas 206 runs in the opposite direction, although, of course, the opposite would be an equally workable system. Two permanent magnets **207*a* and 207*b*, oppositely oriented as indicated by the N and S designations, are joined by magnetically permeable yokes 208, 209, 210 and 211 to two bars of magnetically permeable material 214 and 215 to form a closed magnetic circuit. Bars 214 and 215 are in close proximity to each other but do not actually touch, resulting in the formation of a small gap 216 therebetween. It is arranged that the magnetic tape 201 will pass under this head either in contact with or very nearly in contact with the bars 214 and 215, and thereby bridge the gap 216. In this case, the gap 216 is not a simple slit, but is hollowed out in the middle so as to form a portion 220 through which a current loop may be passed. In this particular case, the current loop is shown as consisting merely of the single turn to conductor 221. This is a perfectly workable system, but it will be appreciated by those skilled in the art that the current loop may consist of a number of turns. In any event, the signal current is introduced into this conducting loop by connection to the output circuit of an amplifier in a well known manner. It will be appreciated that, in the absence of any signal in circuit 221, the M. M. F. distribution across gap 16** will be substantially illustrated in Figure 1*a*. Introduction of signal current in conductor 221 will cause a circumferential field of M. M. F. to be set up around this conductor, but it will be seen that, across the gap 16, this circumferential field acts in a longitudinal direction (i. e., either the same or the opposite direction) with respect to the direction of motion 202 of the tape 201. This is a variable longitudinal component of M. M. F. and it will add algebraically to the previously described M. M. F. arising from the permanent magnets **207*a* and 207*b***, thereby producing a shift in the M. M. F. pattern as illustrated by Figures 1*b* and 1*c*. In order to reduce high frequency losses and to simplify manufacture, the bars 214 and 215 may be made of a sintered powdered iron material. It is clear that this recording head, substantially as shown and described, will produce recordings of the boundary type as described previously. It is also clear that recordings produced by this type of head can be played back on the same type of head as that which would be used to play back recordings made by the recording head of Figure 2.

Still another form of recording head suitable for the purposes of this invention is illustrated in Figure 6. This type of head is well adapted to certain special applications, such as those in which logarithmic recording is desired. It also offers the advantage of overcoming the effects of saturation within the magnetic head itself. Here again, only the longitudinal case is illustrated, although the extension of this type of head to thickness recording is obvious. In this case, tape 301 passes beneath a head 303 which consists of a number of laminations 304, each separated from its neighbor by an air gap 305. Bias current is introduced to the double spiral bias current winding 306. As shown schematically in this Figure 6, the bias current winding makes more turns about the outermost laminations, and fewer and fewer turns about the inner laminations.

For the case of recording by physical displacement of the recording structure in accordance with the signal, it is clear that any of the designs discussed may be employed. However, a head particularly adapted for this purpose may be constructed with a discontinuity in one of the recording lips to provide sharp boundary definitions.

The following may be stated as advantages of this system of magnetic recording as compared to the present practice in the art; first, recordings are afforded which, when subsequently played back, yield a high degree of fidelity and linearity, small variations in the magnetic tape and small irregularities in the magnetized curve of the tape being substantially cancelled out by the inherently self-balancing nature of this recording. Secondly, since this system inherently affords linearity, it is not necessary to provide a supersonic oscillator for biasing purposes in accordance with the present practice of the art. Further, since supersonic bias, which is much higher in frequency than the uppermost signal frequency, need not be used, frequencies up to the limit to which the head will respond satisfactorily, can be recorded. Therefore, it is no longer necessary to limit the top recording frequency to an arbitrary fraction of the supersonic oscillator frequency.

It is also clear that this system affords a means of obtaining the objective in mind entirely without the use of moving parts. The advantage of eliminating moving parts from a high fidelity recording system are obvious.

There is yet another advantage to this system of magnetic recording in that such a recording may be rendered visible by passing the tape through a liquid containing finely divided particles of a magnetic material. The liquid may be oil, water, or any other fluid which does not have a solvent action or any other deleterious action upon the tape itself, while the magnetic powder therein suspended or dissolved may be any of a number of ferro-magnetic substances, such as powdered magnetite, carbonyl-iron, or certain chemical compounds of iron such as ferric chloride. When the tape is passed through such a liquid, the boundary is immediately rendered highly visible since the magnetic particles previously suspended in the liquid tend to adhere strongly to the boundary. After the tape is removed from the liquid, this indication of the boundary may be fixed thereon permanently, as by allowing the liquid to dry. Such visible magnetic recording can be made quite permanent if the liquid is chosen so as to contain a solvent which will evaporate and some solid material which will remain behind, such as, for example, alcohol with shellac dissolved therein. Alternatively, it may be desired to remove the visible indication and subsequently use the magnetic recording in a playback recording as previously described. In this case, it is only necessary to wipe the tape as between two rubber blades or towels; this can readily be done in such a manner that the recording is not injured and is capable of subsequent magnetic playback as well as ever. Figure 7 provides an illustration of a visible record on a tape. The boundary can also be observed by merely sprinkling the powdered magnetic material thereon and then vibrating the record until the particles point out the boundary.

The foregoing descriptions of the specific devices shown in the drawings are for purposes of description only, and the invention is intended to be as broadly construed as possible within the scope of the appended claims.

We claim:

1. A recording unit comprising a continuous circuit of magnetizable material, two sides thereof being closely parallel to one another to form a recording gap therebetween, magnetomotive force generating means arranged in opposition and coupled to the circuit, whereby a boundary between the opposed magnetic fields is produced at a point of the gap, said boundary shifting along the gap as the magnetization of the respective ends of the said loop is differentially changed.

2. A recording unit comprising two magnetically permeable members forming a recording gap therebetween, means magnetically polarizing the members oppositely at opposite end regions, whereby the flux across the gap changes direction at a reversal point within the length of the gap, and means for altering the relative polarization of the end regions in accordance with the imposed signal so that the reversal point is shifted along the length of the gap.

3. The device of claim 2 wherein the means for shifting the reversal point comprises current carrying coils wound around magnetic bridging members which join each end of the said magnetic members.

4. A recording system comprising a magnetic record member adapted to be moved relative to a magnetic recording head, the said recording head comprising two magnetically permeable members forming a recording gap therebetween, means magnetically polarizing the members oppositely at opposite end regions, whereby the flux across the gap changes direction at a reversal point within the length of the gap, means for altering the relative polarization of the end regions in accordance with the imposed signal so that the reversal point is shifted along the length of the gap, and the said record member passing through the said gap, whereby flux in the direction of thickness of the record member is imposed on the record.

5. A recording system comprising a magnetic record member adapted to be moved relative to a magnetic recording head, the said recording head comprising two magnetically permeable members forming a recording gap therebetween, means magnetically polarizing the members oppositely at opposite end regions, whereby the flux across the gap changes direction at a reversal point within the length of the gap, means for altering the relative polarization of the end regions in accordance with an imposed signal so that the reversal point is shifted along the length of the gap, and the said record member passing closely adjacent to the side of the gap, whereby flux in a direction parallel to the direction of relative movement between the said record and the said head is imposed on the record.

6. A magnetic recording unit comprising, a recording gap having width and length dimensions substantially parallel with and transverse to, respectively, the direction of movement of a magnetizable record member adapted to be moved in operative relation to the gap, means for providing across the gap in the widthwise dimension thereof a magnetic field, the magnetic field producing means including means for establishing a point of reversal in direction along the lengthwise dimension of the gap, the field means also comprising means for moving the reversal point along the length of the gap in accordance with a received signal to be recorded to produce a boundary displacement recording.

7. A magnetic recording system comprising, a magnetizable record member, means to move the member, a recording unit having a recording gap, the gap having width and length dimensions substantially parallel with and transverse to, respectively, the direction of movement of the magnetizable record member which is adapted to be moved in operative relation to the gap, means for providing across the gap in the widthwise dimension thereof a magnetic field, the field producing means including means for establishing a point of reversal in direction along the lengthwise dimension of the gap, the field means also comprising means for moving the reversal point along the length of the gap in accordance with a received signal to be recorded to produce a boundary displacement recording.

8. A system as in claim 7 wherein the reversal point moving means is arranged so that the boundary may be caused to be displaced beyond the record member.

9. A magnetic recording unit having in combination a first pole piece having magnetic reluctance, a second pole piece having magnetic reluctance, the pole pieces being positioned to define a recording gap of uniform width and predetermined length, and means for producing a bridging flux between the pole pieces, the flux producing means including means for producing an instantaneous gradient of flux concentration in the pole pieces in the regions thereof in proximity to the gap along the length of the gap to produce a consequent gradient of bridging flux concentration along the length of the gap, the bridging flux producing means including means to vary the flux concentration along the gap in accordance with a signal to be recorded.

10. A unit as in claim 9 wherein the means for producing the instantaneous concentration of flux along the length of the gap comprises means for applying a magnetomotive force to at least one of the pole pieces in such direction as to cause flux to fringe from said pole piece across said gap in varying amounts due to the reluctance of said pole pieces.

11. A unit as in claim 9 wherein the means for producing the instantaneous concentration of flux along the length of the gap includes means for applying a magnetomotive force between adjoining ends of the respective pole pieces, whereby a maximum concentration of flux bridges the gap adjacent said adjoining ends, and decreasing amounts of flux bridge the gap at points remote from the adjoining ends due to the reluctance of the pole pieces.

12. A unit as in claim 9 wherein the means for producing the instantaneous concentration of flux along the length of the gap includes means for applying a magnetomotive force in a first direction between first adjoining ends of the pole pieces and in an opposite direction between the other adjoining ends of the pole pieces, whereby a maximum concentration of flux bridges the gap adjacent the first adjoining ends and a maximum concentration of flux bridges the gap in the opposite direction adjacent the second adjoining ends, and decreasing and reversing concentrations of flux bridge the gap remote from said ends toward the central portion thereof due to the reluctance of the pole pieces.

13. A magnetic recording unit as recited in claim 9 wherein the first pole piece is of uniform reluctance throughout its length, and the second pole piece is of uniform reluctance throughout its length.

14. A unit as in claim 9 wherein the means for producing the gradient of flux includes means for reversing the direction of flux.

15. A magnetic recording system comprising a magnetic record member, a magnetic recording unit, a recording gap in the recording unit, the gap being positioned in proximity to the record member, means for imparting relative motion between the record member and the recording unit in a direction transverse to the gap, the gap being spaced a uniform distance from the record member, the recording unit including magnetomotive force generating means for producing flux across the gap in varying concentration at points therealong, means included in the magnetomotive force generating means for varying the total flux generated in accordance with an intelligence signal to provide a predetermined quantity of flux in one direction across a portion of the gap and flux in another direction across another portion of the gap, the magnetomotive force generating means further including means for varying the relative amounts of generating forces to vary the respective amounts of flux in differing directions to shift the point of direction change of flux along the gap, the width of the record member being less than the length of the gap, whereby the point of flux reversal may move beyond the lateral confines of the record gap in response to intelligence signals of predetermined amplitude.

16. A magnetic recording unit as in claim 9 and further including, a record member comprising magnetic material having prerecorded therein a predetermined degree of magnetization along the length of the member, and means for moving the member past the gap in recording proximity thereto and in the direction of the width dimension of the gap, the arrangement being such that the bridging flux between the pole pieces overcomes the prerecorded flux in the record member to leave in the record member a remnant flux distributed in an instantaneous gradient along the length of the gap and varied along the length of the member in accordance with the signal recorded.

17. Apparatus as in claim 16 wherein the position of the recording unit with respect to the path of the record member is such that the prerecorded flux as modified by said bridging flux may produce a recording having a flux reversal boundary of remnant magnetization due to the overcoming and reversing of the remnant flux in at least a portion of the width of elemental lengths of the record member.

18. Apparatus as in claim 16 wherein the record member is premagnetized to a uniform degree widthwise of the member before being passed by the recording gap.

19. A recording unit as in claim 9 wherein the means for producing an instantaneous gradient of flux includes means for generating across the gap a static component of bridging flux, the static component means including means for causing the static component to reverse in direction between the end regions of the gap, and wherein the means for varying the flux concentration along the gap in accordance with a signal to be recorded includes means for superimposing on the said static field component a component which is substantially uniform along the entire length of the gap but which varies in intensity in accordance with the instantaneous intensity of the signal to be recorded.

20. A magnetic recording unit as in claim 9 wherein the first and second pole pieces comprise a plurality of magnetic members, each of said members defining a magnetic circuit with an elemental recording gap therein, the said elements being placed in closely adjacent side by side positions and magnetically insulated from one another, the said positions being such that the elemental recording gaps are aligned to form said recording gap of uniform width and predetermined length, and wherein the means for producing the bridging flux includes means arranged to magnetize the said elements individually and collectively so that the flux across each elemental recording gap will differ in accordance with a predetermined function from the flux in the other elemental gaps in accordance with the instantaneous amplitude of said signal.

References Cited in the file of this patent

UNITED STATES PATENTS

| | | |
|---|---|---|
| 699,630 | Pedersen | May 6, 1902 |
| 1,971,028 | Bothe | Aug. 21, 1934 |
| 2,236,373 | Kowolski | Mar. 25, 1941 |
| 2,447,899 | Coon | Aug. 24, 1948 |
| 2,469,266 | Howell | May 3, 1949 |
| 2,488,717 | Eilenberger | Nov. 22, 1946 |
| 2,530,564 | Blaney | Nov. 21, 1950 |
| 2,559,505 | Hillier | July 3, 1951 |
| 2,594,414 | Garreau | Apr. 29, 1952 |
| 2,632,061 | Begun | Mar. 17, 1953 |
| 2,657,932 | Blaney | Nov. 3, 1953 |